UNITED STATES PATENT OFFICE.

FLETCHER B. HOLMES, OF WOODBURY, NEW JERSEY, ASSIGNOR TO THE E. I. DU PONT DE NEMOURS POWDER COMPANY, OF WILMINGTON, DELAWARE, A CORPORATION OF NEW JERSEY.

STABILIZED NITRATED STARCH.

No. 875,916.     Specification of Letters Patent.     Patented Jan. 7, 1908.

Application filed May 20, 1907. Serial No. 374,524.

*To all whom it may concern:*

Be it known that I, FLETCHER B. HOLMES, a citizen of the United States, residing at Woodbury, county of Gloucester, and State of New Jersey, have invented a new and useful Improvement in Stabilized Nitrated Starch, of which the following is a full, clear, and exact description.

The object of my invention is to produce stable nitrated starch.

Nitrated starch may be used as an explosive itself, or preferably may be used as a component part of an explosive, such as where it is mixed with sodium nitrate, potassium nitrate, or some other oxygen carrier, with or without the addition of other ingredients. The difficulty with nitrated starch is that it is very unstable, being liable to decomposition. When such nitrated starch decomposes, which it is liable to do at ordinary temperatures, it becomes liable to spontaneous combustion.

I have discovered that I can produce a stable nitrated starch by mixing with nitrated starch the ammonium salt of any one of the organic fatty acids. By the term "organic fatty acids" I intend to include acetic acid and its homologues. Preferably I use ammonium palmitate $CH_3(CH_2)_{14}COONH_4$. I can also use, in addition to ammonium palmitate, the ammonium salts of other acids of the same series such as ammonium acetate $CH_3COONH_4$, ammonium propionate $$CH_3CH_2COONH_4,$$

ammonium butyrate, ammonium stearate, etc. As stated before, I prefer to use ammonium palmitate, but unless specifically claimed, I do not intend to limit myself to that specific ammonium salt of an organic fatty acid.

The amount of the stabilizing agent to be mixed with the nitrated starch is preferably from two to five per cent., although I have used with success larger and smaller amounts. I have found three percent. to give good results.

In practice, after the starch has been nitrated in the ordinary manner, there is mixed with it one of the reagents above set forth. The mixing may be made in any manner to produce a good mixture. They may be mixed wet or dry and in any kind of a mixer. Preferably I mix the two in a finely divided powdered condition in a bowl provided with stirrers or paddles.

Having now fully described my invention, what I claim and desire to protect by Letters Patent is:

1. A stable explosive consisting of a mixture of nitrated starch and an ammonium salt of an organic fatty acid, the latter being in such proportion as to stabilize the nitrated starch.

2. A stable explosive consisting of a mixture of nitrated starch and from two to five percent. of an ammonium salt of an organic fatty acid.

3. A stable explosive consisting of a mixture of nitrated starch and ammonium palmitate, the latter being in such proportion as to stabilize the nitrated starch.

4. A stable explosive consisting of a mixture of nitrated starch and from two to five percent. of ammonium palmitate.

In testimony of which invention, I have hereunto set my hand, at Philadelphia, on this 15th day of May, 1907.

FLETCHER B. HOLMES.

Witnesses:
   M. M. HAMILTON,
   E. E. WALL.